US006131041A

United States Patent [19]

Takeda et al.

[11] Patent Number: 6,131,041

[45] Date of Patent: Oct. 10, 2000

[54] WIRELESS TERMINAL EQUIPMENT INCLUDING ELECTRIC COMPONENT HAVING CONDUCTOR FILM FORMED ON INSULATIVE BASE

[75] Inventors: Kazuhiro Takeda, Miyazaki; Hiromi Sakita, Miyazaki-ken; Kenzou Isozaki, Saito; Noriya Sato, Miyazaki-ken, all of Japan

[73] Assignee: Matsushita Electric Industrial Co., Ltd., Osaka, Japan

[21] Appl. No.: 09/317,130

[22] Filed: May 24, 1999

Related U.S. Application Data

[62] Division of application No. 08/853,944, May 9, 1997.

[30] Foreign Application Priority Data

| | | | |
|---|---|---|---|
| Oct. 11, 1996 | [JP] | Japan | 8-269583 |
| Oct. 11, 1996 | [JP] | Japan | 8-269584 |
| Oct. 11, 1996 | [JP] | Japan | 8-269587 |
| Oct. 11, 1996 | [JP] | Japan | 8-269588 |

[51] Int. Cl.[7] .......... H04Q 1/02; H01F 27/30

[52] U.S. Cl. .......... 455/550; 455/575; 336/206; 336/200; 336/196

[58] Field of Search .......... 455/566, 90, 575, 455/550; 336/180, 184, 196, 200, 206

[56] References Cited

U.S. PATENT DOCUMENTS

| | | | |
|---|---|---|---|
| 4,314,221 | 2/1982 | Satou et al. | 336/83 |
| 4,368,447 | 1/1983 | Inomata et al. | 336/20 |
| 4,696,100 | 9/1987 | Yamamoto et al. | 29/605 |
| 5,398,400 | 3/1995 | Breen | 29/602.1 |
| 5,532,667 | 7/1996 | Haertling et al. | 336/177 |
| 5,764,126 | 12/1996 | Kanetaka et al. | 336/96 |
| 5,805,043 | 9/1998 | Bahl | 336/200 |

FOREIGN PATENT DOCUMENTS

| | | |
|---|---|---|
| 0588306 | 3/1994 | European Pat. Off. . |
| 9642094 | 12/1996 | European Pat. Off. . |
| 62-8924 | 2/1987 | Japan . |
| 1-238003 | 9/1989 | Japan . |
| 1-238007 | 9/1989 | Japan . |
| 5-129133 | 5/1993 | Japan . |
| 5-299250 | 11/1993 | Japan . |
| 62-15950 | 8/1994 | Japan . |
| 7-10913 | 2/1995 | Japan . |
| 7-74023 | 3/1995 | Japan . |
| 7-297033 | 11/1995 | Japan . |
| 7-307201 | 11/1995 | Japan . |
| 1413735 | 11/1975 | United Kingdom . |

OTHER PUBLICATIONS

Full copy of and Partial translation of an Office Action dated Apr. 14, 1999 in Japanese Patent Application No. 8–26984.

Full copy of and Partial translation of an Office Action dated Apr. 22, 1999 in Japanese Patent Application No. 8–269587.

Full copy of and Partial translation of an Office Action dated Apr. 20, 1999 in Japanese Patent Application No. 8–269583.

Full copy of and Partial translation of an Office Action dated Apr. 20, 1999 in Japanese Patent Application No. 8–269588.

Taoka et al. "Chip Inductors for High–Frequency Applications," National Technical Report vol. 42, No. 4, Aug. 1996, pp. 26–34.

Patent Abstracts of Japan, vol. 10, No. 125 (E–402), JP 600257118 A (Matsushita).

Patents Abstracts of Japan, vol. 9, No. 310 (E–364), JP 600144922 A (Fuji).

Patent Abstracts of Japan, vol. 8, No. 213 (E–269), JP 590098508 A (Fuji).

*Primary Examiner*—Dwayne D. Bost
*Assistant Examiner*—Erika Gary
*Attorney, Agent, or Firm*—Stevens, Davis, Miller & Mosher, L.L.P.

[57] ABSTRACT

An inductance device wherein a conductor film is formed on a base, grooves are formed in the conductor film, a protective material is disposed on the grooves, and a length L1, a width L2 and a height L3 of the inductance device satisfy-the following relation:

L1=0.5 to 1.5 mm;

L2=0.2 to 0.7 mm; and

L3=0.2 to 0.7 mm.

20 Claims, 12 Drawing Sheets

WIRELESS TERMINAL EQUIPMENT INCLUDING ELECTRIC COMPONENT HAVING CONDUCTOR FILM FORMED ON INSULATIVE BASE

This is a division of application Ser. No. 08/853,944 filed May 9, 1997.

BACKGROUND OF THE INVENTION

1. Field of the Invention

This invention relates to an inductance device which will be used suitably for electronic appliances for mobile communication, etc, particularly for a radio frequency circuit, and a wireless terminal equipment using such inductance device.

2. Description of the Related Art

FIG. 15 of the accompanying drawings is a side view of an inductance device according to the prior art. In the drawing, reference numeral 1 denotes a square pole base, reference numeral 2 denotes a conductor film formed on the base 1, reference numeral 3 denotes grooves formed in the conductor film and reference numeral 4 denotes a protective material laminated on the conductor film 2.

Characteristics of such electronic components can be adjusted to desired characteristics by adjusting the gap of the grooves 3, and the like.

The inductance devices of this kind are disclosed in JP-A-7-307201, JP-A-7-297033, JP-A-5-129133, JP-A-1-238003, JP-U-57-117636, JP-A-5-299250, and so forth.

According to the construction described above, however, miniaturization of electronic appliances cannot be achieved because a circuit board for mounting the inductance device becomes too great if the inductance device is great in size. When the inductance device is too small, on the contrary, problems such as breakage of the inductance device occur when it is mounted on the circuit bard.

SUMMARY OF THE INVENTION

It is therefore an object of the present invention to provide an inductance device which can reduce the size of electronic appliances and is yet free from device breakage, etc, to eliminate the problems of the prior art described above, and to provide a wireless terminal equipment using such inductance device.

DESCRIPTION OF THE PREFERRED EMBODIMENTS

Figure 1:
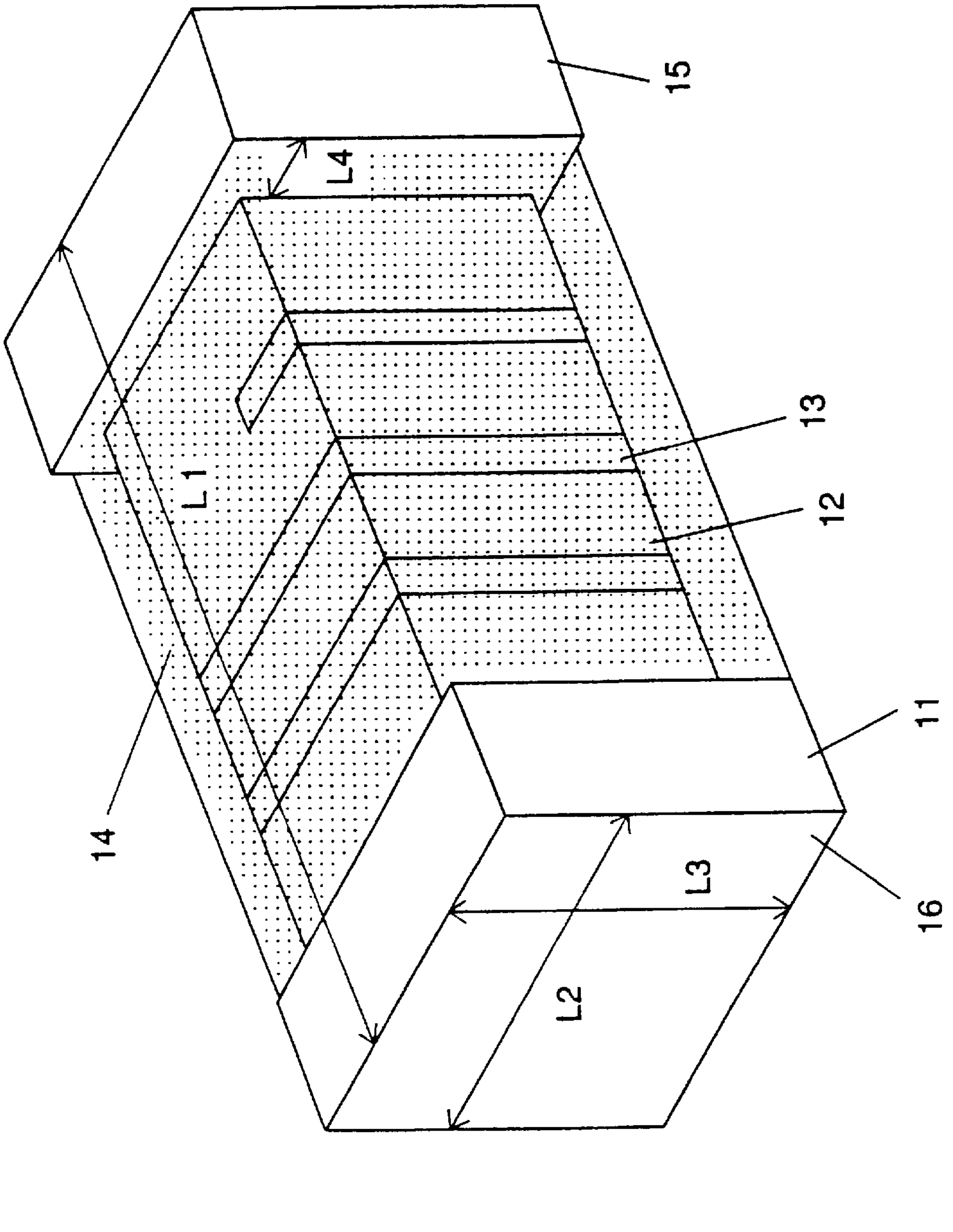
FIG. 1 is a perspective view showing an inductance device according to one embodiment of the present invention.
Figure 2:
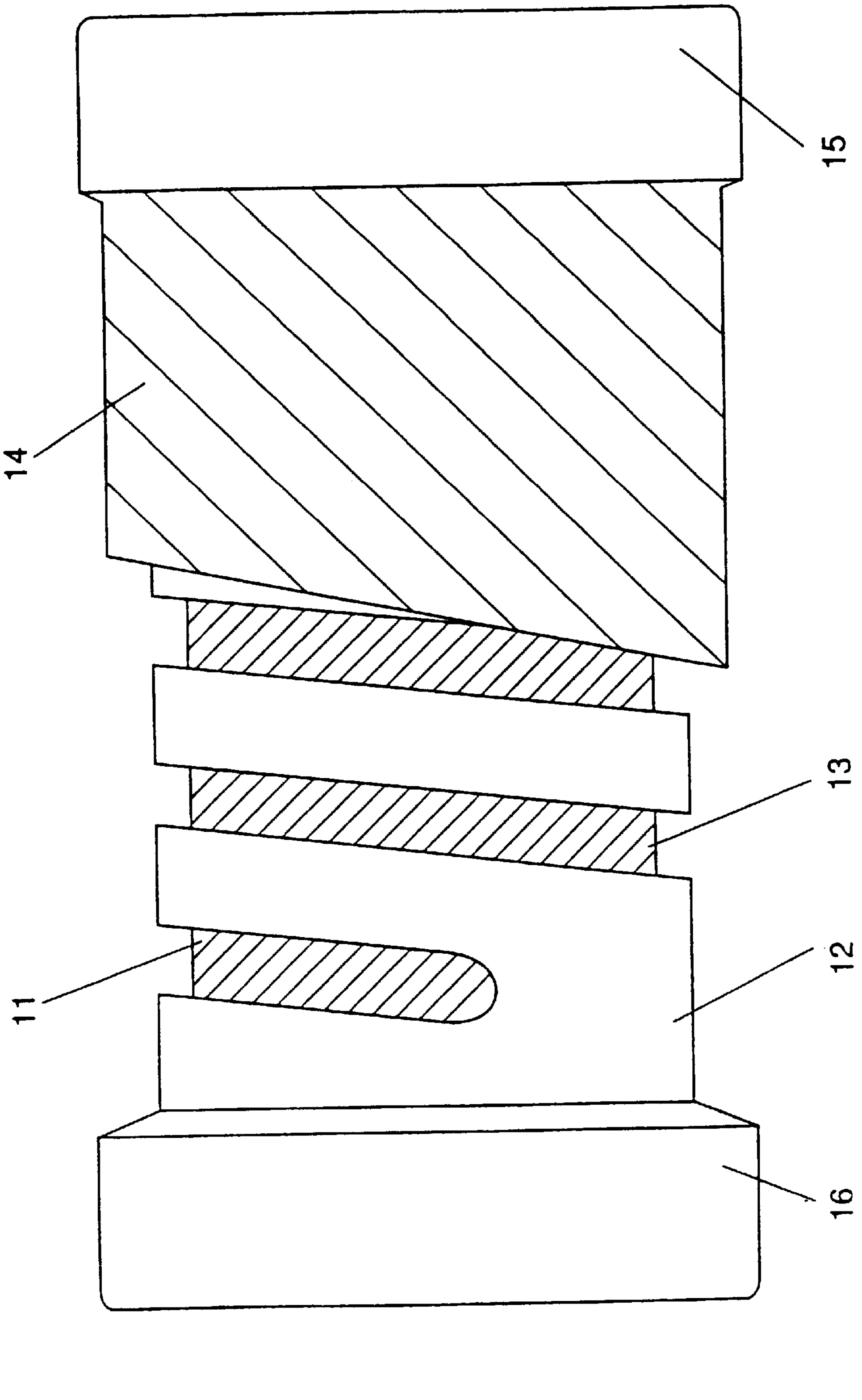
FIG. 2 is a side view showing the inductance device according to one embodiment of the present invention.

FIGS. 1 and 2 are a perspective view and a side view showing an inductance device according to one embodiment of the present invention, respectively.

In FIG. 1, reference numeral 11 denotes a base produced by press-molding or extruding an insulating material, or the like, and reference numeral 12 denotes a conductor film deposited on the base 11. The conductor film 12 is formed on the base 11 by plating or a vapor deposition method such as sputtering. Reference numeral 13 denotes grooves which are disposed in the base 11 and in the conductor film 12. They are formed by radiating a laser beam, etc, to the conductor film 12 or by mechanical method of applying a grinding wheel, etc. Reference numeral 14 denotes a protective material coated to the portions of the base 11 and the conductor film 12 at which the grooves 13 are defined. Reference numerals 15 and 16 denote terminal portions each equipped with a terminal electrode. The grooves 13 and the protective material 14 are interposed between these terminal portions 15 and 16. Incidentally, FIG. 2 is a side view in which a part of the protective material 14 is cut away.

The inductance device according to this embodiment is practically adapted to a high frequency range up to 1–6 GHz and has a very small inductance of not greater than 50 nH. Moreover, the inductance device preferably has a length L1, a width L2 and a height L3 as follows:

L1=0.5 to 1.5 mm (preferably, 0.6 to 1.1 mm and further preferably, 0.6 to 1.0 mm)

L2=0.2 to 0.7 mm (preferably, 0.3 to 0.6 mm)

L3=0.2 to 0.7 mm (preferably, 0.3 to 0.6 mm)

When L1 is smaller than 0.5 mm, both of the self-resonance frequency f0 and the Q value drop and excellent characteristics cannot be obtained. When L1 exceeds 1.5 mm, on the other hand, the device itself becomes great in size. In consequence, the circuit board for mounting electronic components, etc, (hereinafter called the "circuit board" for short) cannot be miniaturized and eventually, the electronic appliance having the circuit board mounted thereto cannot be miniaturized, either. When both of L2 and L3 are smaller than 0.2 mm, the mechanical strength of the device itself becomes so low that when the device is mounted on the circuit board, etc, by using a mounting machine, device breakage is likely to occur. When L2 and L3 exceed 0.7 mm, on the other hand, the device becomes so great in size that the circuit board and eventually the appliance cannot be miniaturized. Incidentally, L4 (depth of gradation) is preferably from 5 to 50 μm. When L4 is smaller than 5 μm, the thickness of the protective material 14 must be reduced and excellent protection performance cannot be obtained. When L4 exceeds 50 μm, on the other hand, the mechanical strength of the base becomes low and device breakage, etc, is also likely to occur.

Figure 3:
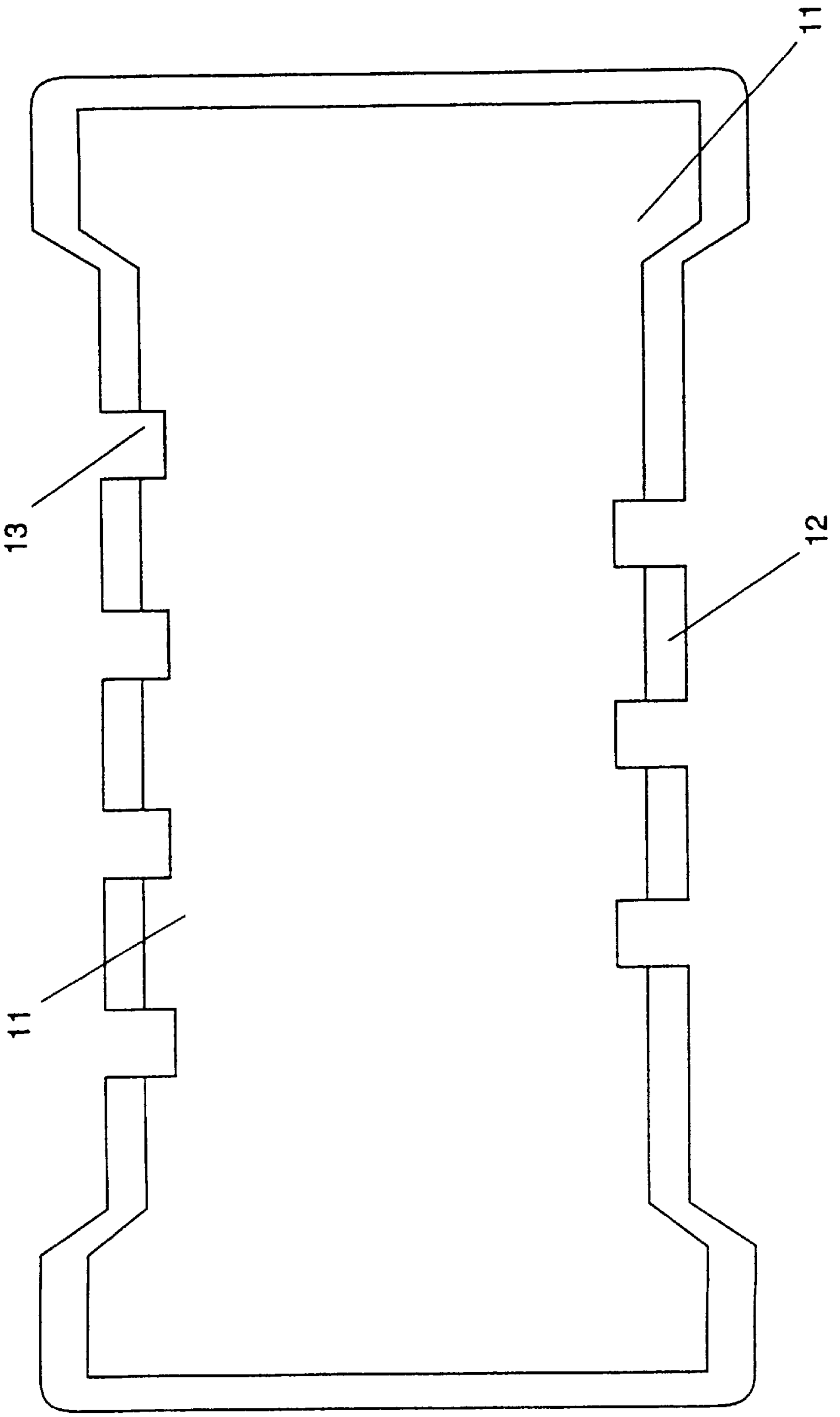
FIG. 3 is a sectional view showing a base on which a conductor film is formed, for use in the inductance device according to one embodiment of the present invention.

Each part of the inductance device having such a construction will be explained in detail. FIG. 3 is a sectional view of the base on which the conductor film is formed, and FIGS. 4(*a*) and (*b*) are a side view and a bottom view of the base, respectively.

To begin with, the shape of the base 11 will be explained.

Figure 4B:
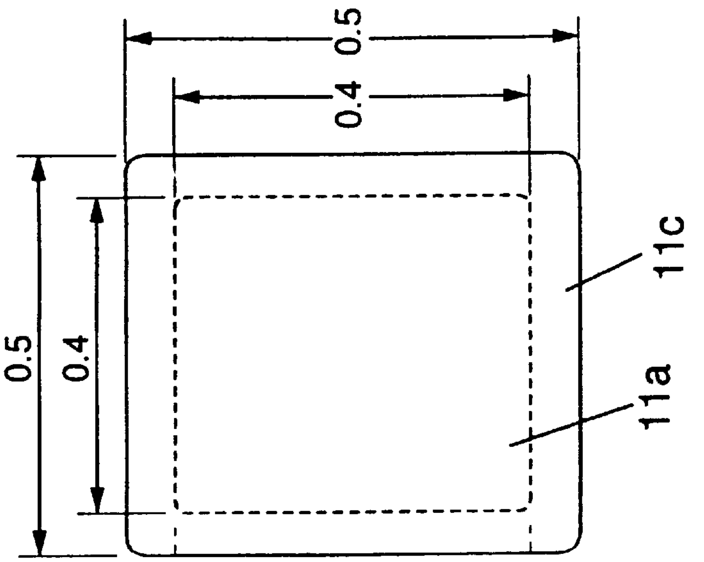
FIG. 4 is a perspective view showing the base used for the inductance device according to one embodiment of the present invention.
Figure 4A:
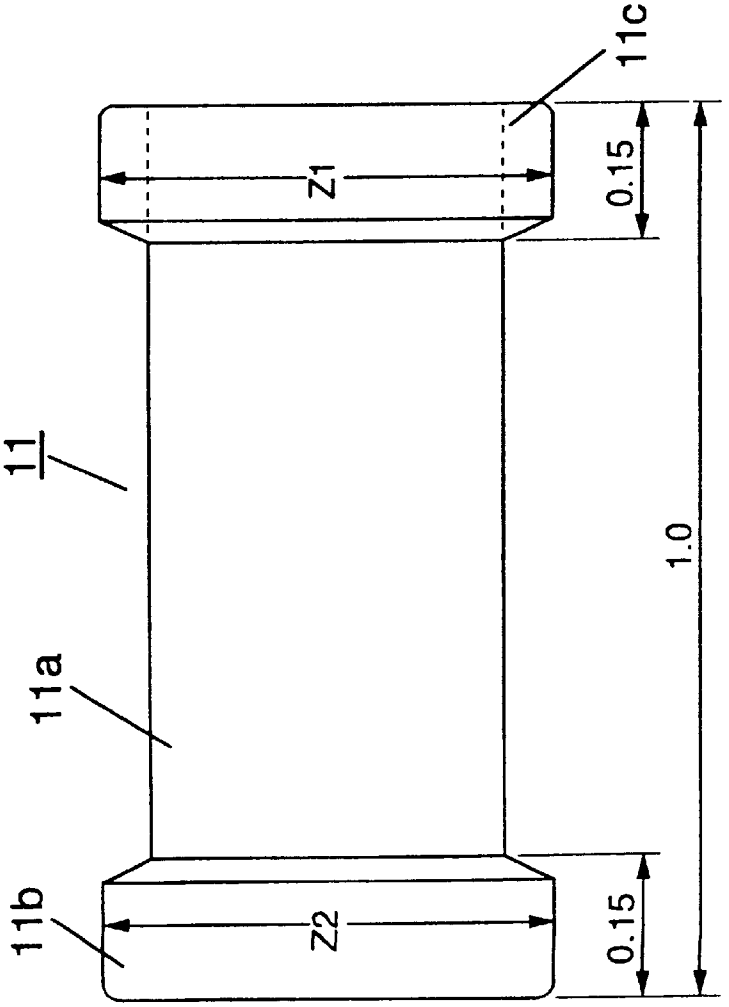

As shown in FIGS. 3 and 4, the base 11 comprises a center portion 11*a* having a rectangular section so as to insure easy packaging to the circuit board and end portions 11*b* and 11*c* integrally disposed at both ends of the center portion 11*a* and each having a rectangular section. Though the end portions 11*b* and 11*c* and the center portion 11 have a rectangular section in this embodiment, they may have a polygonal section such as a pentagonal or hexagonal section. The center portion 11*a* is recessed from the end portions 11*b* and 11*c*. In this embodiment, since the end portions 11*b* and 11*c* have a substantially square sectional shape, fittability of the inductance device to the circuit board can be improved, and since the grooves 13 are defined transversely in the center portion 11*a*, the base 11 has no directivity in whichever way it may be mounted on the circuit board. Therefore, its handling becomes easy. A device portion (grooves 13 and protective material 14) is formed at the center portion 11*a* while the terminal portions 15 and 16 are formed at the end portions 11*b* and 11*c*.

Though the center portion 11*a* and the end portions 11*b* and 11*c* have a substantially square sectional shape in this embodiment, they may have a regular polygonal sectional shape such as a regular pentagonal section. Furthermore, though the center portion 11*a* and the end portions 11*c* and 11*b* have the same sectional shape, e.g. the square sectional shape, they may be different. For example, the end portions 11*b* and 11*c* have a regular polygonal sectional shape while the center portion 11*a* has another polygonal sectional shape or a round sectional shape. When the sectional shape of the center portion 11*a* is round, the grooves 13 can be formed satisfactorily.

The center portion 11*a* is recessed from the end portions 11*b* and 11*c* in this embodiment so that when the protective material 14 is applied, its contact with the circuit board, etc, can be prevented. However, the center portion 11*a* need not be recessed depending on the thickness of the protective material 14 and the situation of the circuit board (when a groove is formed at the mounting portion of the circuit board or when the electrode portion of the circuit board swells up). If the center portion 11*a* is not recessed from the end portions 11*b* and 11*c*, the structure of the base 11 becomes simpler, productivity can be improved and furthermore, the mechanical strength of the center portion hla can be improved. In the case where the recess is not formed, the base 11 also may have a square pole shape having a rectangular section or a prism having a polygonal section.

The heights Z1 and Z2 of the end portions of the base 11 as shown in FIG. 4(*a*) preferably satisfy the following condition:

$$|Z1-Z2| \leq 80\ \mu m \text{ (preferably, } 50\ \mu m)$$

Figure 5:
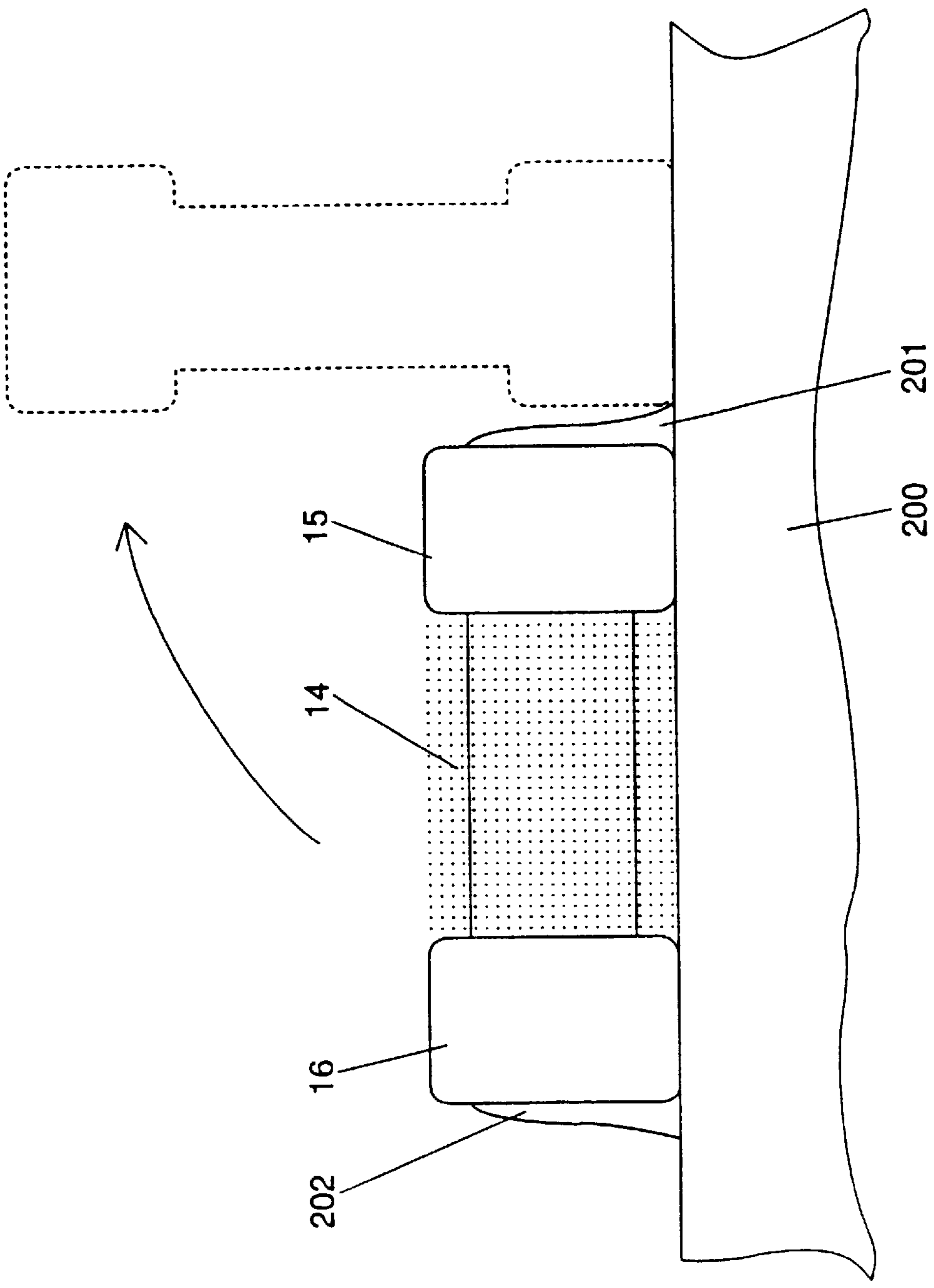
FIG. 5 is a side view showing a Manhattan phenomenon.

When the difference between Z1 and Z2 exceeds 80 μm (preferably, 50 μm), the device is attracted towards one of the end portions by the surface tension of the solder, etc, when the device is mounted on the circuit board and fitted to the circuit board by the solder, and in this case, the possibility of the so-called "Manhattan phenomenon" in which the device stands upright becomes extremely high. FIG. 5 shows this Manhattan phenomenon. As shown in FIG. 5, the inductance device is disposed on the circuit board 200 and the solders 201 and 202 are sandwiched between the terminal portion 15 and the circuit board 200 and between the terminal portion 16 and the circuit board 200, respectively. When these solders 201 and 202 are molten by reflow, etc, the surface tensions of the molten solders 201 and 202 become different between the terminal portions 15 and 16 due to the difference of their application quantities, the difference of their melting point resulting from the difference of the materials, etc, so that the device turns with one of the end portions (terminal portion 15 in FIG. 5) being the center and stands upright as shown in FIG. 5. When the difference of the height of Z1 and Z2 exceeds 80 μm (preferably, 50 μm), the device is disposed under the inclined state on the circuit board 200 and this arrangement promotes stand-up of the device. The Manhattan phenomenon occurs particularly remarkably in a small and light-weight chip type electronic component (inclusive of a chip type inductance device), and as one of the factors for the occurrence of this Manhattan phenomenon, the arrangement of the device under the inclined state on the circuit board 200 due to the difference of height between the terminal portions 15 and 16 is particularly taken into consideration. As a result, the occurrence of the Manhattan phenomenon can be drastically restricted by shaping the base 11 in such a fashion that the difference of height between Z1 and Z2 is not greater than 80 μm (preferably, 50 μm). The occurrence of the Manhattan phenomenon can be suppressed substantially completely by limiting the difference of height between Z1 and Z2 to not greater than 50 μm.

Next, chamfering of the base 11 will be explained.

Figure 6:
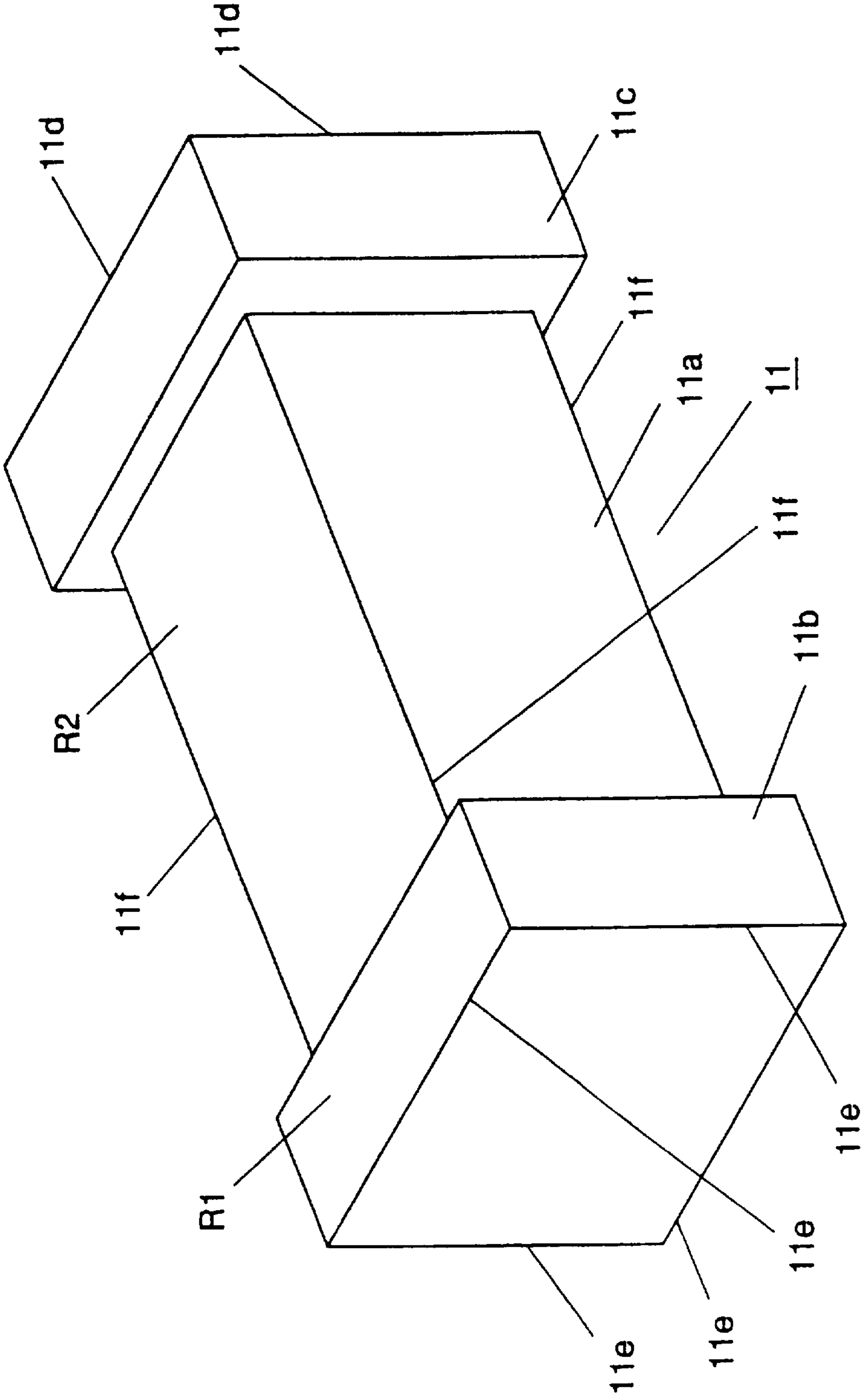
FIG. 6 is a perspective view showing the base used for the inductance device according to one embodiment of the present invention.

FIG. 6 is a perspective view of the base used for the inductance device according to one embodiment of the present invention. As shown in FIG. 6, corners 11*e* and 11*d* of the end portions 11*b* and 11*c* of the base ii are chamfered, and the radius R1 of curvature of each of the chamfered corners 11*e* and 11*d* and the radius R2 of curvature of the corner 11*f* of the center portion 11*a* are preferably shaped to satisfy the following relation:

$$0.03 < R1 < 0.15 \text{ (unit: mm)}$$

$$0.01 < R2 \text{ (unit: mm)}$$

When R1 is smaller than 0.03 mm, each of the corners 11*e* and 11*d* is pointed and is likely to crack even due to a small impact, and deterioration of performance is likely to develop due to such a crack. When R1 exceeds 0.15 mm, the corners 11*e* and 11*d* are rounded so much that the Manhattan phenomenon is more likely to occur. When R2 is smaller than 0.01 mm, fins are likely to occur at the corner 11*f*, and the thickness of the conductor film 12, which is formed on the center portion 11_a_ and greatly governs performance of the device, becomes greatly different between the corner 11_f_ and the flat portion so that variance of the device characteristics becomes great.

Next, the constituent materials of the base 11 will be explained. The constituent materials of the base 11 preferably satisfy the following characteristics:

volume resistivity: $10^{13}$ (preferably, $10^{14}$) or more thermal expansion coefficient:

$5\times10^{-4}$ (preferably, $2\times10^{-5}$) or less at 20 to 500° C.

dielectric constant: 12 (preferably, 10) or less at 1 MHz bending strength: 1,300 kg/cm$^2$ (preferably, 2,000 kg/cm$^2$) or more density: 2 to 5 g/cm$^3$ (preferably, 3 to 4 g/cm$^3$)

When the volume resistivity of the constituent materials of the base 11 is smaller than $10^{13}$, a predetermined current starts flowing through the base 11, too, with the conductor film 12, and a parallel circuit is formed. Therefore, the self-resonance frequency f0 and the Q value drop, and as a result, the device is not suitable to a high frequency use.

When the thermal expansion coefficient exceeds $5\times10^{-4}$, cracks are likely to develop in the base 11 due to heat shock, etc. In detail, when the thermal expansion coefficient is greater than $5\times10^{-4}$, the base 11 locally attains a high temperature because the laser beam or the grinding wheel is used to form the grooves 13 as already described. This occurrence of the cracks can be drastically restricted when the thermal expansion coefficient satisfies the requirement described above.

When the dielectric constant is greater than 12 at 1 MHz, the self-resonance frequency f0 and the Q value drop, so that the device is not suitable as a high frequency device.

When the bending strength is smaller than 1,300 kg/cm$^2$, device breakage, etc, sometimes occurs when the device is mounted on the circuit board by using the mounting apparatus.

When the density is smaller than 2 g/cm$^3$, the water absorbing capacity of the base 11 becomes so high that its characteristics are extremely deteriorated and device performance drops. When the density exceeds 5 g/cm$^3$, the weight of the substrate becomes great and problems occur in the mounting property, and so forth. Particularly when the density is limited to the range described above, the water absorbing capacity is small, intrusion of water into the base 11 hardly occurs, the base becomes light in weight, and no problem occurs, in particular, when the device is mounted on the circuit board by a chip mounter.

When the volume resistivity, the thermal expansion coefficient, the dielectric constant, the bending strength and the density of the base 11 are limited as described above, the self-resonance frequency f0 and the Q value do not drop, and the device can be used as a high frequency device. Furthermore, because the occurrence of cracks due to the heat shock, etc, in the base 11 can be restricted, a defect ratio can be reduced. Because the mechanical strength can be improved, the device can be mounted on the circuit board, etc, by using the mounting machine and productivity can be improved.

Examples of the materials that can acquire various characteristics described above are ceramic materials consisting of alumina as the principal components. However, these characteristics cannot be obtained always by merely using the ceramic materials consisting principally of alumina. In other words, since these characteristics vary with the press pressure for molding the base, the baking temperature and the additives, the production condition must be suitably adjusted. As an example of the concrete production condition, the press pressure is 2 to 5 tons (2,000–5,000 kg) at the time of shaping of the base 11, the baking temperature is 1,500 to 1,600° C. and the baking time is 1 to 3 hours. Concrete examples of the alumina materials are at least 92 wt % of $Al_2O_3$, not greater than 6 wt % of $SiO_2$, not greater than 1.5 wt % of MgO, not greater than 0.1% of $Fe_2O_3$, not greater than 0.3 wt % of $Na_2O$, and so forth.

Next, the surface coarseness of the base 11 will be explained. The term "surface coarseness" used in the following description means mean coarseness at the center line, and the term "coarseness" used for the explanation of the conductor film 12 also means mean coarseness at the center line.

Figure 7:
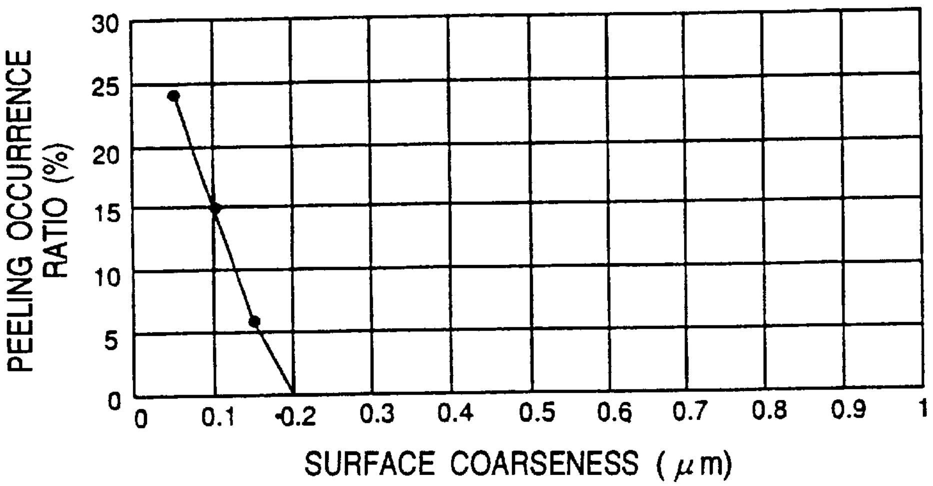
FIG. 7 is a graph showing the relation between a surface coarseness and a peeling occurrence ratio of the base used for the inductance device according to one embodiment of the present invention.

The surface coarseness of the base 11 is about 0.15 to about 0.5 μm, preferably about 0.2 to about 0.3 μm. FIG. 7 is a graph showing the relation between the surface coarseness of the base 11 and a peeling occurrence ratio and shows the result of the following experiment. The base 11 and the conductor film 12 are made of alumina and copper, respectively, and samples are produced by variously changing the surface coarseness of the base 11. The conductor film 12 is formed on each sample under the same condition. After each sample is washed by an ultrasonic wave process, the surface of the conductor film 12 is examined so as to measure the existence of any peel. The surface coarseness of the base 11 is measured by a surface coarseness meter (produced by Tokyo Seimitsu Surfcom K. K., Model 574A) having a distal end R of 5 μm. As can be appreciated from the graph, when the mean surface coarseness is not smaller than 0.15 μm, the occurrence ratio of peel of the conductor film 12 formed on the base 11 is about 5%, and a good bonding strength can be obtained between the base 11 and the conductor film 12. When the surface coarseness is greater than 0.2 μm, further, peel of the conductor film 12 hardly occurs. Therefore, the surface coarseness of the base 11 is preferably at least 0.2 μm, if possible. Because peel of the conductor film 12 is one of the great factors of deterioration of various characteristics, the peel occurrence ratio is preferably not greater than 5% from the aspect of the production yield, etc.

Figure 8:
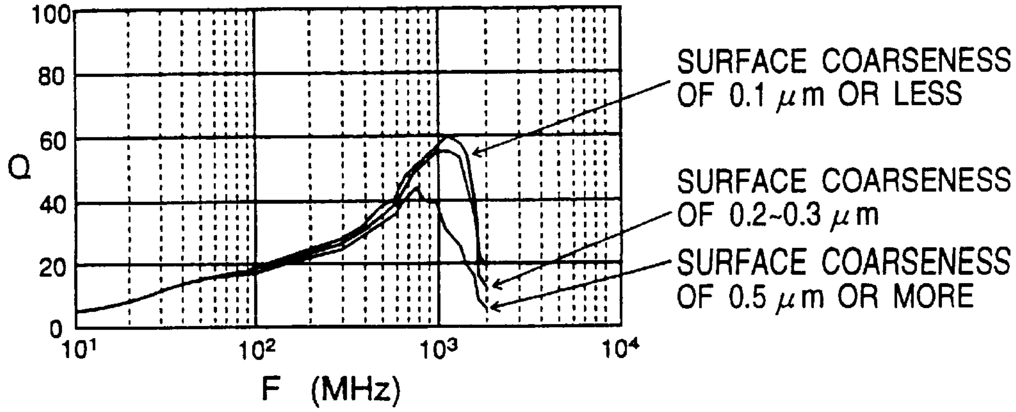
FIG. 8 is a graph showing the relation between a frequency and a Q value taking as a parameter the surface coarseness of the base used for the inductance device according to one embodiment of the present invention.

FIG. 8 is a graph showing the relation between the frequency F and the Q value taking as a parameter the surface coarseness of the base, and shows the result of the following experiment. First, samples of the bases 11 having a coarseness of 0.1 μm or less, a surface coarseness of 0.2 to 0.3 μm and a surface coarseness of 0.5 μm or more, respectively, are produced, and the conductor film made of the same material (copper) and having the same thickness is formed on each sample. The Q value of each sample at a predetermined frequency F is measured. As can be seen from FIG. 8, the drop of the Q value, which presumably results from the deterioration of the film structure of the conductor film 12, is observed when the surface coarseness of the base 11 is greater than 0.5 μm, and deterioration of the Q value is remarkable particularly in the high frequency range. The self-resonance frequency f0 (maximum value of each line) also shifts towards the low frequency side when the surface coarseness of the base 11 is 0.5 μm or more. From the aspects of the Q value and the self-resonance frequency f0, therefore, the surface coarseness of the base 11 is preferably not greater than 0.5 μm.

As described above, judging from the adhesion strength between the conductor film 12 and the base 11 and from the result of both of the Q value and self-resonance frequency f0 of the conductor film, the surface coarseness of the base is preferably 0.15 to 0.5 μm and further preferably, 0.2 to 0.3 μm.

The surface coarseness at the end portions 11*b* and 11*c* is preferably different from that of the center portion 1*a*. In other words, the mean surface coarseness at the end portions 11*b* and 11*c* is preferably smaller than that of the center portion 11*a* within the mean surface coarseness range of 0.15 to 0.5 μm. Because the terminal portions 15 and 16 are constituted by laminating the conductor film 12 at the end portions 11*b* and 11*c*, the surface coarseness of the conductor film 12 formed on the end portions 11*b* and 11*c* can be reduced by making the surface coarseness of the end portions 11*b* and 11*c* smaller than that of the center portion 11*a*. In this way, adhesion with the electrode of the circuit substrate, etc, can be improved, and the circuit board and the inductance device can be bonded more reliably. Because the grooves 13 are formed by laminating the conductor film 12 at the center portion 11*a*, the adhesion strength between the conductor film 12 and the base 11 must be improved lest the conductor film 12 peel off from the base 11 when the grooves 13 are formed by the laser beam, etc. For this reason, the surface coarseness of the center portion lla is preferably greater than that of the end portions 11*b* and 11*c*. Particularly when the grooves 13 are formed by the laser, the temperature rises more drastically at the portion to which the laser is radiated than the other portions, and the conductor film 12 sometimes peels due to the heat shock, etc. When the grooves 13 are formed by the laser, therefore, the bonding density must be improved much more between the conductor film 12 and the substrate 11 than at other portions.

When the surface coarseness is made different between the center portion hla and the end portions 11*b* and 11*c* in this way, adhesion with the circuit board, etc, can be improved and peel of the conductor film 12 at the time of processing of the grooves 13 can be prevented.

In this embodiment, the bonding strength between the conductor film 12 and the base is improved by adjusting the surface coarseness of the base 11, but it can be improved without adjusting the surface coarseness, for example, by disposing an intermediate layer made of Cr alone or an alloy of Cr with other metals between the base 11 and the conductor film 12. Needless to say, a higher adhesion strength can be obtained between the conductor film 12 and the base 11 by adjusting the surface coarseness of the base 11 and moreover, laminating the intermediate layer and the conductor film 12 on the base 11.

Next, the conductor film 12 will be explained.

The conductor film 12 preferably has a very small inductance of 50 nH or less, a Q value of at least 30 at a radio frequency signal of 800 MHz or more and further, a self-resonance frequency of 1 to 6 GHz. The materials and the production method must be selected appropriately to obtain the conductor film 12 having such characteristics.

Hereinafter, the conductor film 12 will be explained more concretely.

Figure 9:
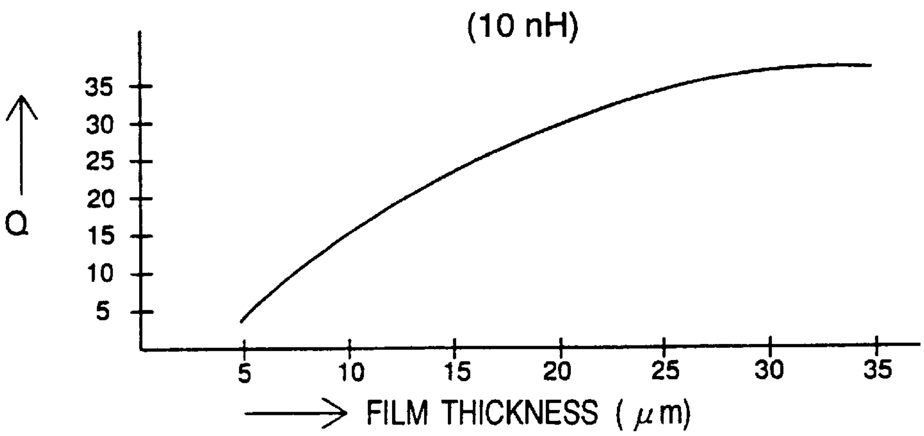
FIG. 9 is a graph showing the relation between a film thickness of the conductor film used for the inductance device and a Q value in one embodiment of the present invention.

The constituent materials of the conductor film 12 are electrically conductive materials such as copper, silver, gold, nickel, and so forth. Predetermined elements may be added to copper, silver, gold, nickel, etc, so as to improve the weather resistance. Alloys between the conductive materials and non-metallic materials may be used, too. Copper and its alloys are used in most cases as the constituent materials from the aspects of the production cost, the weather resistance and easiness of production. When copper or the like is used as the material of the conductor film 12, a foundation film is first formed on the base 11 by electroless plating and a predetermined copper film is then formed on the foundation film by electroplating to provide the conductor film 12. When the alloys are used to form the conductor film 12, sputtering or vapor deposition is preferably used for forming the conductor film 12. When copper and its alloys are used as the constituent materials, the formation thickness of the conductor film 12 is preferably at least 15 μm. When the thickness is smaller than 15 μm, the Q value of the conductor film 12 becomes so great that predetermined characteristics cannot be obtained so easily. FIG. 9 is a graph showing the relation between the film thickness of the conductor film 12 and the Q value when an inductance is 10 nH. The Q values are measured by using copper as the constituent material of the conductor film 12 and changing the thickness of the conductor film 12 formed on the base 11 while the material of the base 11, its surface coarseness, etc, are kept under the same condition. As can be seen from FIG. 9, the Q value exceeds 30 when the thickness of the conductor film 12 is at least 21 μm. Therefore, the thickness of the conductor film 12 is preferably at least 21 μm. Because the Q value cannot be much improved within the range of the thickness of the conductor film 12 exceeding 35 μm, the thickness is preferably not greater than 35 μm from the aspect of the production cost and to reduce the defect ratio.

The conductor film 12 may have a single-layered structure or a multi-layered structure. In other words, a plurality of conductor films made of different constituent materials may be laminated to produce the conductor film 12. For example, corrosion of copper can be prevented by forming first a copper film on the base 11 and then laminating a metal film (nickel, etc) having a good weather resistance, though the weather resistance is not fully satisfactory.

The methods of forming the conductor film 12 include plating (electroplating and electroless plating), sputtering, vapor deposition, and so forth. Among them, plating has gained a wide application because it has high productivity and provides less variance in the film thickness.

Figure 10:
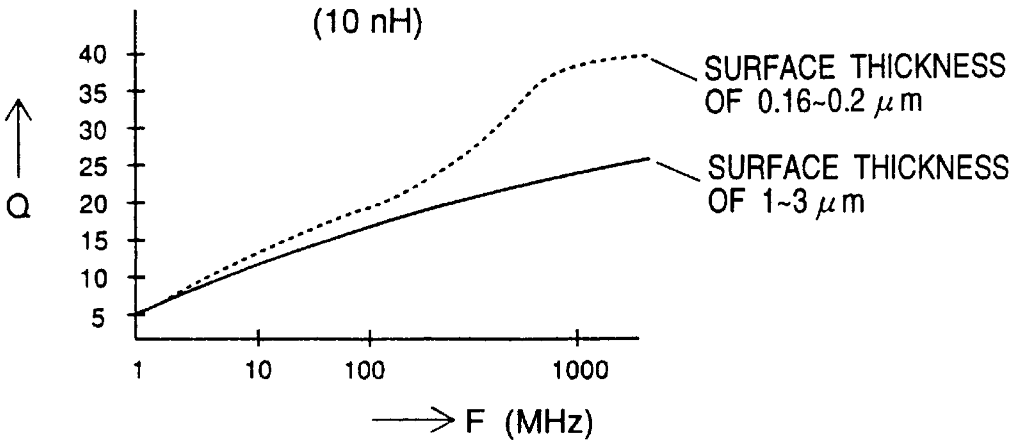
FIG. 10 is a graph showing the relation between the frequency and the Q value taking as a parameter the surface coarseness of the conductor film used for the inductance device according to one embodiment of the present invention.

The surface coarseness of the conductor film 12 is preferably not greater than 1 μm and further preferably, not greater than 0.2 μm. When the surface coarseness of the conductor film 12 exceeds 1 μm, the Q value at a high frequency drops due to the skin effect. FIG. 10 is a graph showing the relation between the frequency F and the Q value taking the surface thickness of the conductor film 12 as a parameter. The result shown in FIG. 10 is plotted on the basis of the following experiment. First, conductor films 12 are formed by changing the surface coarseness on the bases 11 having the same size, made of the same material and having the same surface coarseness, and the Q value at each frequency of each sample is measured. As can be seen from FIG. 10, the Q value becomes small in the high 15 frequency range when the surface coarseness of the conductor film 12 is greater than 1 μm. It can be also appreciated from FIG. 10 that when the surface coarseness of the conductor film 12 is not greater than 0.2 μm, the Q value in the high frequency range, in particular, becomes extremely high.

As described above, the surface coarseness of the conductor film 12 is preferably not greater than 1.0 μm and further preferably, not greater than 0.2 μm. When this condition is satisfied, the skin effect of the conductor film 12 can be reduced, and the Q value in the high frequency range, in particular, can be improved.

The adhesion strength between the conductor film 12 and the base 11 is preferably such that when the base 11 having the conductor film 12 formed thereon is left standing for several seconds at a temperature of 400° C., the conductor film 12 is not peeled from the base 11. When the device is packaged to the substrate, etc, the device undergoes self exothermal or heat from other members is applied to the device, so that a temperature of not lower than 200° C. is applied in some cases to the device. Therefore, if the conductor film 12 is not peeled from the base 11 at 400° C., deterioration of the device characteristics does not occur even when heat is applied to the device.

Next, the protective material 14 will be explained.

Organic materials having excellent weather resistance and materials having an insulating property such as an epoxy resin are used for the protective material 14. The protective material 14 preferably has transparency such that the condition of the grooves 13, etc, can be observed. Further, the protective material 14 preferably keeps its transparency. When the protective material 14 is colored in red, blue, green, etc, different from the colors of the conductor film 12 and the terminal portions 15 and 16, each portion of the device can be easily distinguished from others and inspection of each device portion can be carried out easily. When the color of the protective material 14 is changed in accordance with the size of the device, its characteristics, its type number, etc, the mistake of fitting the devices having different characteristics, type numbers, etc, to wrong portions can be reduced.

Figure 11:
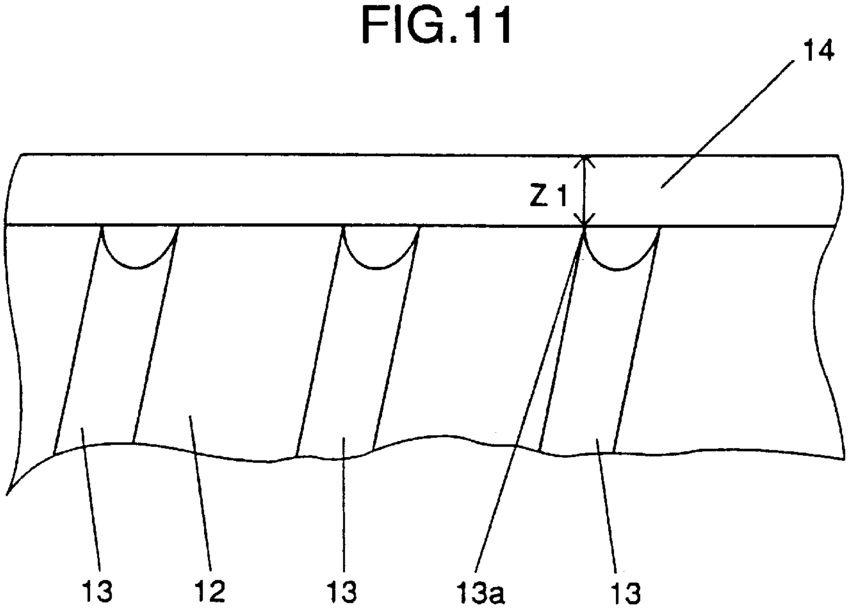
FIG. 11 is a side view of a portion of the inductor device on which a protective material is provided, according to one embodiment of the present invention.

The protective material 14 is applied preferably in such a fashion that the length Z1 from the corner portions 13*a* of the grooves 13 to the surface of the protective material 14 is at least 5 μm as shown in FIG. 11. When Z1 is smaller than 5 μm, deterioration of the characteristics and discharge are likely to develop, and the characteristics of the device might drop drastically. The corner portions 13*a* of the grooves 13 are those portions at which discharge, etc, its particularly likely to develop, and the protective material 14 having a thickness of at least 5 μm is deposited extremely preferably on the corner portions 13*a*. Electrode films, etc, are formed in some cases by again applying plating after the protective material 14 is formed, and unless the protective material 14 having a thickness of at least 5 μm is formed on the corner portions 13*a*, the electrode film, etc, is directly formed on the protective material 14 which invites disadvantages if the electrode fails, etc, adheres thereto, and deterioration of the characteristics occur.

Next, the terminal portions 15 and 16 will be explained.

Though the terminal portions 15 and 16 are allowed to function sufficiently even by the conductor film 12 alone, in order to let them cope with various environments and conditions, a multi-layered structure is preferably employed.

Figure 12:
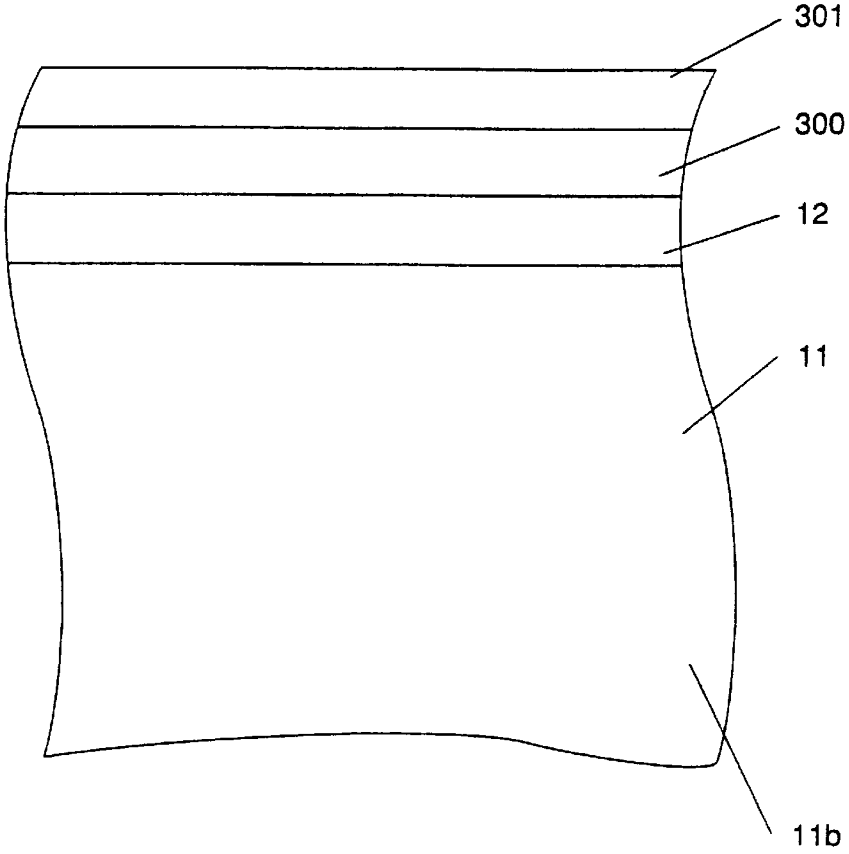
FIG. 12 is a sectional view of a terminal portion of the inductance device according to one embodiment of the present invention.

FIG. 12 is a sectional view of the terminal portion 15. In FIG. 12, the conductor film 12 is shown formed on the end portion 11*b* of the base 11, and a protective layer 300 made of a material having the weather resistance such as nickel, titanium, etc, is formed on the conductor film 12. A bonding layer 301 made of a solder, etc, is further formed on the protective layer 300. The protective layer 300 improves the bonding strength between the bonding layer and the conductor film 12 and the weather resistance of the conductor film. In this embodiment, either nickel or a nickel alloy is used as the constituent material of the protective layer 300, and the solder is used as the constituent material of the bonding layer 301. The thickness of the protective layer 300 (nickel) is preferably 2 to 7 μm. When the thickness is smaller than 2 μm, the weather resistance drops and when it exceeds 7 μm, the electric resistance of the protective layer 300 (nickel) itself becomes so great that the device characteristics are remarkably deteriorated. The thickness of the bonding layer 301 (solder) is preferably 5 to 10 μm. When the thickness is smaller than 5 μm, the bonding layer 301 is apt to be lost in the soldering process (soldering defect) and satisfactory bonding between the device and the circuit board cannot be expected. When the thickness exceeds 10 μm, the Manhattan phenomenon is more likely to occur, and mounting ability drops remarkably.

The inductance device constituted in the way described above is free from deterioration of the characteristics but has extremely high mounting ability and productivity.

Next, the production method of this inductance device will be explained.

First, the base 11 is produced by press-molding or extruding an insulating material such as alumina. The conductor film 12 is then formed on the base 11 as a whole by plating or sputtering. The spiral grooves 13 are formed on the base 11 on which the conductor film 12 is deposited. These grooves 13 are formed by laser processing or cutting. Since laser processing has extremely high productivity, the explanation will be given on this method. First, the base 11 is fitted to a rotary machine and while the base 11 is rotated, a laser beam is radiated to the center portion 11*a* of the base 11 to remove both of the conductor film 12 and the base and to thereby form the spiral grooves. YAG laser, excimer laser, carbonic acid gas laser, etc, can be employed in this case. The laser beam is contracted by a lens, etc, and is radiated to the center portion 11*a* of the base 11. Further, the depth of the grooves 13, etc, can be adjusted by adjusting power of laser and the width of the grooves 13, etc, can be adjusted by exchanging the lens used for contracting the laser beam. Since absorptivity of the laser is different depending on the constituent materials of the conductor film 12, etc, the kind of the laser (wavelength of laser) is preferably and appropriately selected in accordance with the constituent materials of the conductor film 12.

After the grooves 13 are formed, the protective material 14 is applied to the portions where the grooves 13 are formed (center portion 11), and is then dried.

A product can be completed at this stage, but the nickel layer and the solder layer are laminated particularly on the end portions 15 and 16 so as to improve the weather resistance and bondability. The nickel layer and the solder layer are formed on the semi-finished product having the protective material 14 formed thereon, by plating, or the like.

Though this embodiment has been explained about the inductance device, similar effects can be likewise obtained for those electronic components which have the conductor film formed on the base made of an insulating material.

Figure 13:
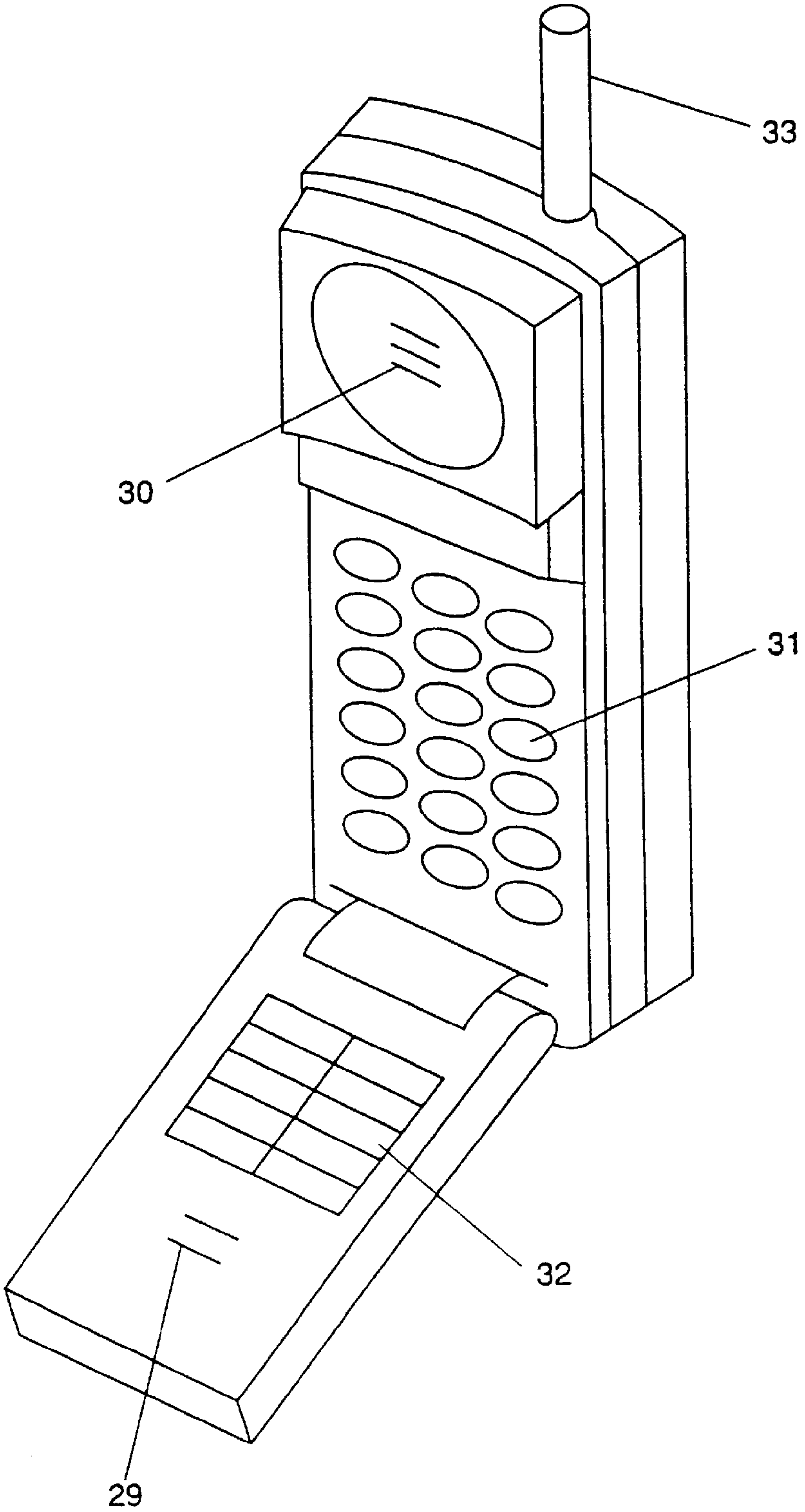
FIG. 13 is a perspective view showing a wireless terminal equipment according to one embodiment of the present invention.
Figure 14:
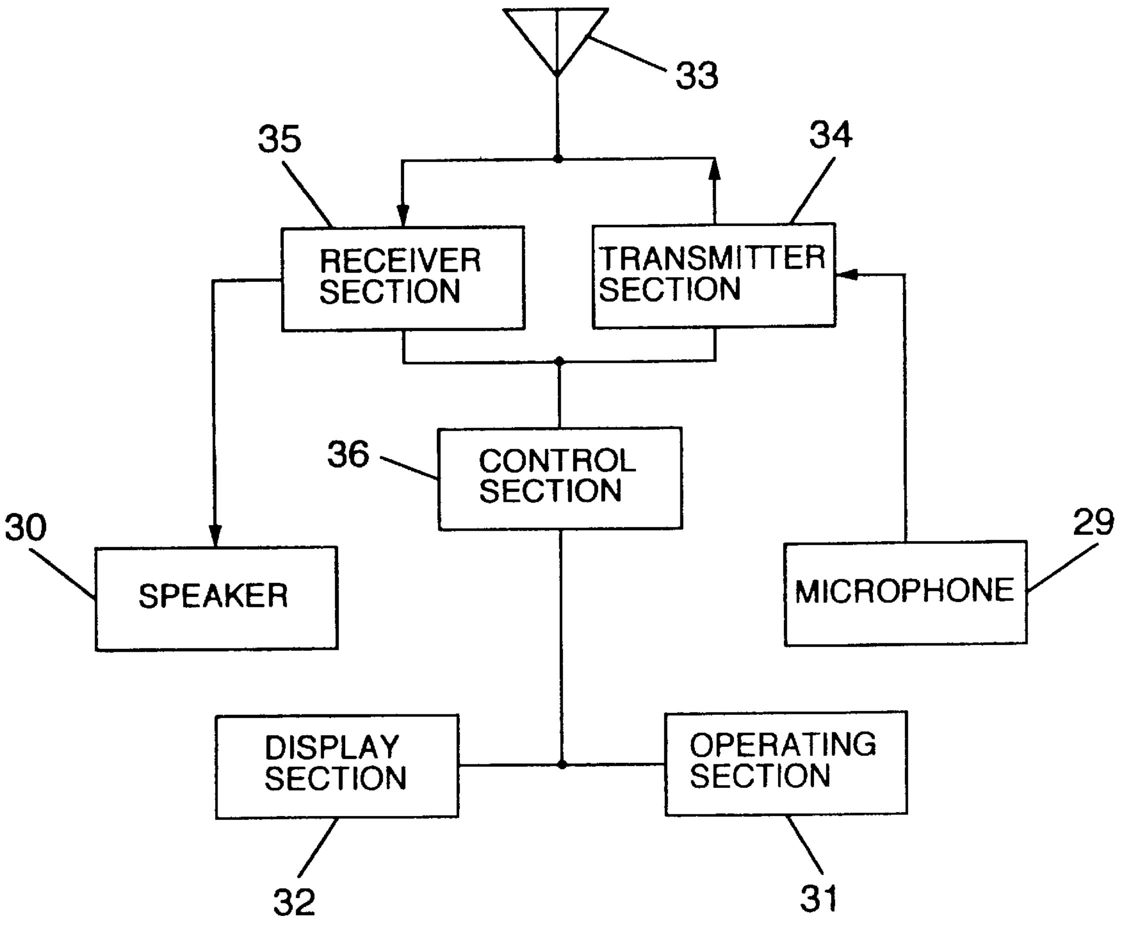
FIG. 14 is a block diagram showing the wireless terminal equipment according to one embodiment of the present invention.
Figure 15:
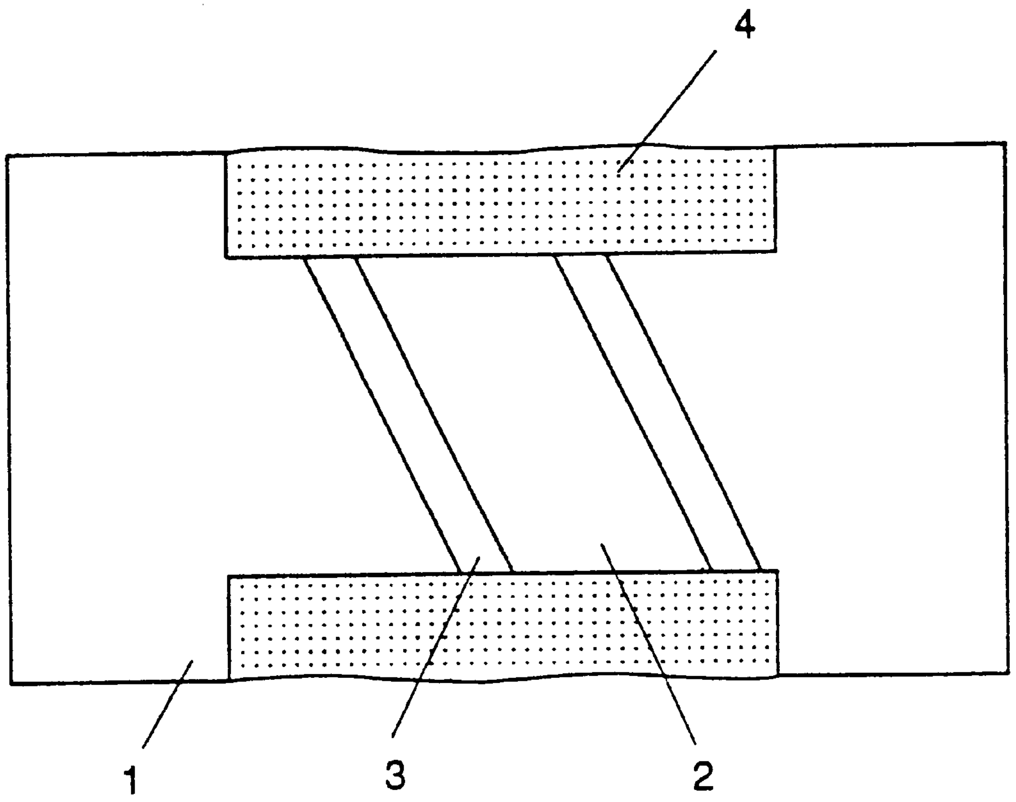
FIG.15 PRIOR ART
FIG. 15 is a side view showing an inductance device according to the prior art.

FIGS. 13 and 14 show a wireless terminal equipment according to an embodiment of the present invention. In these drawings, reference numeral 29 denotes a microphone for converting sound to audio signals, reference numeral 30 denotes a speaker for converting the audio signals to the sound, reference numeral 31 denotes an operation portion comprising dial buttons, etc, reference numeral 32 denotes a display portion for displaying a call, etc, reference numeral 33 denotes an antenna and reference numeral 34 denotes a transmission portion for demodulating the audio signals from the microphone 29 and converting them to transmission signals. The transmission signals generated by the transmission portion 34 are emitted outside through the antenna. Reference numeral 35 denotes a reception portion for converting the reception signals received by the antenna to the audio signals. The audio signals generated by the reception portion 35 are converted to the sound by the speaker 30. Reference numeral 36 denotes a control portion for controlling the transmission portion 34, the reception portion 35, the operation portion 31 and the display portion 32.

Next, an example of its operation will be explained.

When a call is received, a call signal is sent from the reception portion 35 to the control portion 36 and the control portion 36 causes the display portion 32 to display predetermined characters, etc, on the basis of the call signal. When a button, etc, representing that the call is received from the operation portion is pushed, the signal is sent to the control portion 36. Receiving this signal, the control portion 36 sets each portion to the call mode. In other words, the signal received by the antenna 33 is converted to the audio signal by the reception portion 35, the audio signal is output as the sound from the speaker 30, the sound inputted from the microphone 29 is converted to the sound signal, and the signal is then emitted outside through the transmission portion 34 and the antenna 33.

Next, operation of transmission will be explained.

In the transmission mode, the signal representing transmission is input from the operation portion 31 to the control portion 36. When the signal corresponding to the telephone number is subsequently sent from the operation portion 31 to the control portion 36, the control portion 36 transmits the signal corresponding to the telephone number from the transmission portion 34 through the antenna 33. When the communication with the receiving party is established by this transmission signal, the signal representing the communication is sent from the reception portion 35 to the control portion 36, and the control portion 36 sets each portion to the transmission mode. In other words, the signal received by the antenna 33 is converted by the reception portion 35 to the audio signal and this signal is output as the sound from the speaker 30. The sound inputted from the microphone 29 is converted to the audio signal and is transmitted outside from the transmission portion 34 through the antenna 33.

The inductance device explained above (shown in FIGS. 1 to 12) is used for a filter circuit or a matching circuit inside the transmission portion 34 and the reception portion 35, and several to dozens of such inductance devices are used in one wireless terminal equipment. Because the circuit board, etc, used inside the equipment can be miniaturized by using such inductance devices, the size of the equipment itself can be reduced, too. Moreover, because the problems such as device breakage can be prevented, the defect ratio can be reduced and productivity can be improved.

We claim:

1. A wireless terminal equipment comprising:

audio signal conversion means for converting sound into an audio signal;

operation means for inputting information data;

display means for displaying the input information data and indicating an incoming call;

transmission means for modulating the audio signal to obtain a transmission signal;

an antenna for transmitting the transmission signal and receiving a reception signal;

reception means for demodulating the reception signal to obtain an audio signal; and control means for controlling said operation means, said display means, said transmission means and said reception means;

wherein at least one of said transmission means and said reception means includes an electric component, said electric component comprising:

a base having a portion in which a recess is formed, said recess having a depth of 5 to 50 $\mu$m;

a conductor film formed on said portion of said base, at least one groove being formed in said conductor film; and a protective material formed on said conductor film within said recess of said base;

wherein said electric component has a length of 0.5 to 1.5 mm, and a width and a height of 0.2 to 0.7 mm.

2. A wireless terminal equipment according to claim 1, wherein said at least one groove is formed in a spiral shape.

3. A wireless terminal equipment according to claim 1, wherein said electric component further comprises terminal electrodes provided at both end portions of said base.

4. A wireless terminal equipment according to claim 1, wherein each end portion of said base has a polygonal shape.

5. A wireless terminal equipment according to claim 1, wherein said at least one groove is formed by laser processing.

6. A wireless terminal equipment according to claim 1, wherein said protective material is formed on a portion of said conductor film where said at least one groove is formed in said conductor film and has a depth of at least 5 $\mu$m.

7. A wireless terminal equipment according to claim 1, wherein:

said information data includes a telephone number; and said at least one of said transmission means and said reception means includes at least one of a filter circuit and a matching circuit which includes said electric component.

8. A wireless terminal equipment comprising:

audio signal conversion means for converting sound into an audio signal;

operation means for inputting information data;

display means for displaying the input information data and indicating an incoming call;

transmission means for modulating the audio signal to obtain a transmission signal;

an antenna for transmitting the transmission signal and receiving a reception signal;

reception means for demodulating the reception signal to obtain an audio signal; and control means for controlling said operation means, said display means, said transmission means and said reception means;

wherein at least one of said transmission means and said reception means includes an electric component, said electric component comprising:

a base; and a conductor film formed on a portion of said base, at least one groove being formed in said conductor film, wherein:

said electric component has a length of 0.5 to 1.5 mm, and a width and a height of 0.2 to 0.7 mm; and said conductor film has a surface coarseness of 1 $\mu$m or less.

9. A wireless terminal equipment according to claim 8, wherein said conductor film is made of copper, silver, gold, nickel or an alloy including one of them and has a thickness of 21 to 35 $\mu$m so that said electric component has a Q value of at least 30 at a frequency of 800 MHz.

10. A wireless terminal equipment according to claim 8, wherein:

said information data includes a telephone number; and said at least one of said transmission means and said reception means includes at least one of a filter circuit and a matching circuit which includes said electric component.

11. A wireless terminal equipment comprising:

audio signal conversion means for converting sound into an audio signal;

operation means for inputting information data;

display means for displaying the input information data and indicating an incoming call;

transmission means for modulating the audio signal to obtain a transmission signal;

an antenna for transmitting the transmission signal and receiving a reception signal;

reception means for demodulating the reception signal to obtain an audio signal; and control means for controlling said operation means, said display means, said transmission means and said reception means;

wherein at least one of said transmission means and said reception means includes an electric component, said electric component comprising:

a base; and a conductor film formed on a portion of said base, at least one groove being formed in said conductor film, wherein:

said electric component has a length of 0.5 to 1.5 mm, and a width and a height of 0.2 to 0.7 mm; and said base has a volume resistivity of at least $10^{13}$, a heat expansion coefficient of not larger than $5\times10^{-4}$ at 20 to 500° C., a dielectric constant of not larger than 12 at 1 MHz, a bending strength of at least 1,300 kg/cm$^2$ and a density of 2 to 5 g/cm$^3$.

12. A wireless terminal equipment according to claim 11, wherein a constituent material of said base contains alumina.

13. A wireless terminal equipment according to claim 11, wherein:

said information data includes a telephone number; and said at least one of said transmission means and said reception means includes at least one of a filter circuit and a matching circuit which includes said electric component.

14. A wireless terminal equipment comprising:

audio signal conversion means for converting sound into an audio signal;

operation means for inputting information data;

display means for displaying the input information data and indicating an incoming call;

transmission means for modulating the audio signal to obtain a transmission signal;

an antenna for transmitting the transmission signal and receiving a reception signal;

reception means for demodulating the reception signal to obtain an audio signal; and control means for controlling said operation means, said display means, said transmission means and said reception means;

wherein at least one of said transmission means and said reception means includes an electric component, said electric component comprising:

a base; and a conductor film formed on a portion of said base, at least one groove being formed in said conductor film, wherein:

said electric component has a length of 0.5 to 1.5 mm, and a width and a height of 0.2 to 0.7 mm; and said base has a surface coarseness of 0.15 to 0.5 $\mu$m.

15. A wireless terminal equipment according to claim 14, wherein end portions of said base have a different surface coarseness from that of a portion of said base where said at least one groove is formed in said conductor film.

16. A wireless terminal equipment according to claim 14, wherein:

said information data includes a telephone number; and said at least one of said transmission means and said reception means includes at least one of a filter circuit and a matching circuit which includes said electric component.

17. A wireless terminal equipment comprising:

audio signal conversion means for converting sound into an audio signal;

operation means for inputting information data;

display means for displaying the input information data and indicating an incoming call;

transmission means for modulating the audio signal to obtain a transmission signal;

an antenna for transmitting the transmission signal and receiving a reception signal;

reception means for demodulating the reception signal to obtain an audio signal; and control means for controlling said operation means, said display means, said transmission means and said reception means;

wherein at least one of said transmission means and said reception means includes an electric component, said electric component comprising:

a base; and a conductor film formed on a portion of said base, at least one groove being formed in said conductor film, wherein:

said electric component has a length of 0.5 to 1.5 mm, and a width and a height of 0.2 to 0.7 mm; and end portions of said base respectively have heights Z1 and Z2 satisfying the following relation:

$$|Z1-Z2|\leq 80\ \mu m.$$

18. A wireless terminal equipment according to claim 17, wherein:

said information data includes a telephone number; and said at least one of said transmission means and said reception means includes at least one of a filter circuit and a matching circuit which includes said electric component.

19. A wireless terminal equipment comprising:

audio signal conversion means for converting sound into an audio signal;

operation means for inputting information data;

display means for displaying the input information data and indicating an incoming call;

transmission means for modulating the audio signal to obtain a transmission signal;

an antenna for transmitting the transmission signal and receiving a reception signal;

reception means for demodulating the reception signal to obtain an audio signal; and control means for controlling said operation means, said display means, said transmission means and said reception means;

wherein at least one of said transmission means and said reception means includes an electric component, said electric component comprising:

a base; and a conductor film formed on a portion of said base, at least one groove being formed in said conductor film, wherein:

said electric component has a length of 0.5 to 1.5 mm, and a width and a height of 0.2 to 0.7 mm; and both end portions of said base have chamfered corners with a radius of curvature larger than 0.03 mm and smaller than 0.15 mm; and a center portion of said base, where said at least one groove is formed in said conductor film, has chamfered corners with a radius of curvature larger than 0.01 mm.

20. A wireless terminal equipment according to claim 19, wherein:

said information data includes a telephone number; and said at least one of said transmission means and said reception means includes at least one of a filter circuit and a matching circuit which includes said electric component.

* * * * *